(12) United States Patent
Cicchitti

(10) Patent No.: US 11,724,463 B2
(45) Date of Patent: Aug. 15, 2023

(54) METHOD FOR THE INSPECTION OF BONDING PATTERNS OF PACKAGES FOR PRODUCTS

(71) Applicant: Fameccanica.Data S.p.A., San Giovanni Teatino (IT)

(72) Inventor: Anselmo Cicchitti, San Giovanni Teatino (IT)

(73) Assignee: Fameccanica.Data S.p.A., San Giovanni Teatino (IT)

( * ) Notice: Subject to any disclaimer, the term of this patent is extended or adjusted under 35 U.S.C. 154(b) by 0 days.

(21) Appl. No.: 17/901,934

(22) Filed: Sep. 2, 2022

(65) Prior Publication Data
US 2023/0077208 A1    Mar. 9, 2023

(30) Foreign Application Priority Data

Sep. 7, 2021 (EP) .................................... 21195199

(51) Int. Cl.
*B29C 65/00* (2006.01)
(52) U.S. Cl.
CPC ...... *B29C 66/1122* (2013.01); *B29C 66/7294* (2013.01)

(58) Field of Classification Search
CPC ... B29C 65/18; B29C 65/203; B29C 65/7894; B29C 66/91216; B29C 66/97
USPC ............................................................. 156/64
See application file for complete search history.

(56) References Cited

U.S. PATENT DOCUMENTS

| 11,524,467 | B2* | 12/2022 | DiChiara .......... B29C 66/91655 |
| 2007/0237201 | A1 | 10/2007 | Ignatowicz |
| 2018/0078665 | A1 | 3/2018 | Buccellato |

OTHER PUBLICATIONS

European Search Report dated Feb. 1, 2022. 6 pages.

* cited by examiner

*Primary Examiner* — James D Sells
(74) *Attorney, Agent, or Firm* — RMCK Law Group PLC

(57) ABSTRACT

A non-destructive, non-invasive method for inspection of bonding patterns of packages for products, such as patches or medicated patches, involves thermally probing the packages and the bonding patterns and retrieving a thermal response thereof. The inspection is based in the analysis of the thermal response.

15 Claims, 3 Drawing Sheets

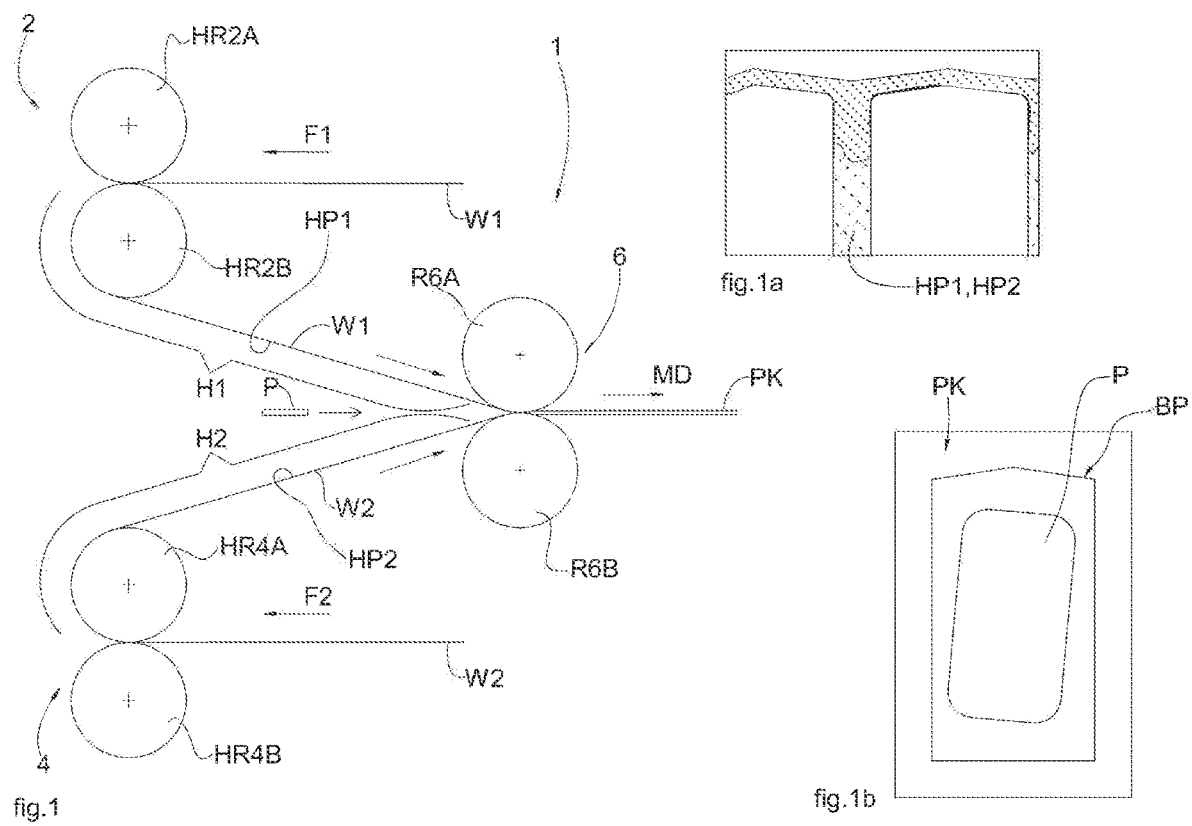

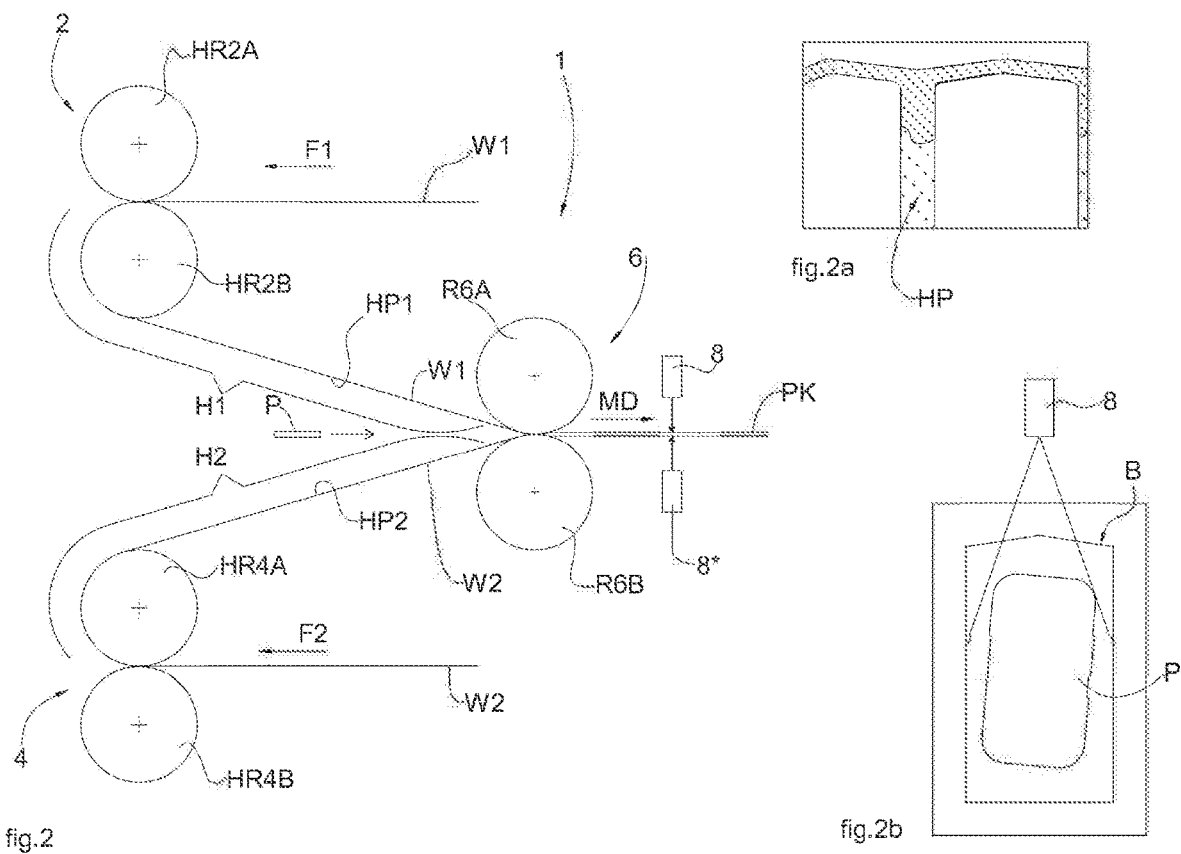

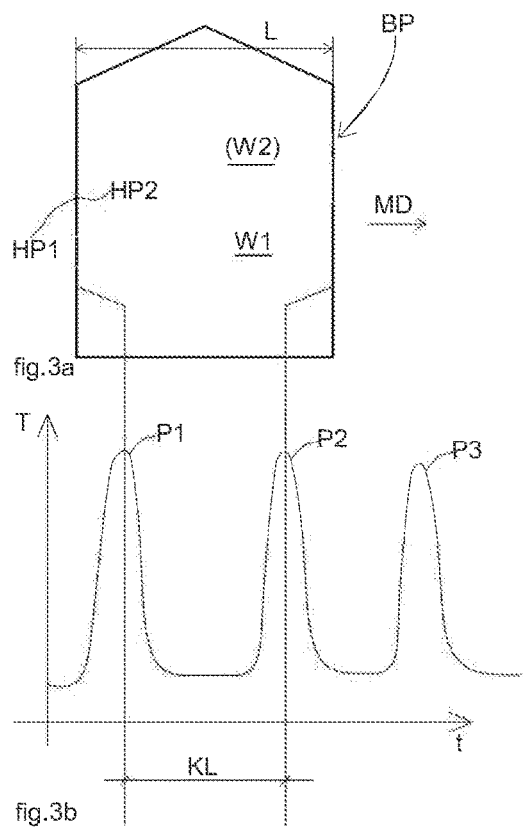
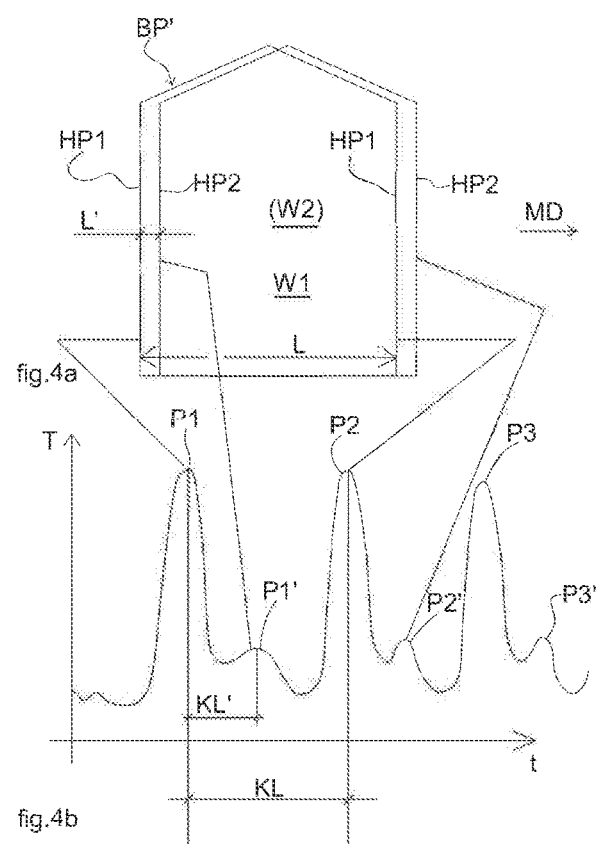

METHOD FOR THE INSPECTION OF BONDING PATTERNS OF PACKAGES FOR PRODUCTS

CROSS-REFERENCE TO RELATED APPLICATION

This application claims priority to European Patent Application No. 21195199.1 filed Sep. 7, 2021. The disclosure of the above application is incorporated herein by reference in its entirety.

FIELD OF THE INVENTION

The present invention relates to the packaging of items such as sanitary products, particularly patches or medicated patches for medical use, which involves bonding of layers of packaging material around the packaged item along a bonding pattern. The invention has been developed with particular reference to bonding patterns involving thermal activation of the bond.

PRIOR ART

FIG. 1 schematically shows a manufacturing process of packages PK for items P, for instance patches or medicated patches, featuring a bonding pattern BP.

Packages PK are typically assembled in a machine 1 by feeding a first web material W1 and a second web material W2 through respective pairs 2, 4 of heated patterned rollers. Specifically, each pair of heated patterned rollers 2, 4, comprises a first patterned heated roller H2RA, H4RA and a second patterned heated roller H2RB, H4RB arranged on opposite sides of the respective web material W1, W2, which negotiates the rollers H2RA, H2RB and H4RA, H4RB in a respective feed direction F1, F2. Feeding of the web material W1 and the web material W2 through the rollers H2RA, H2RB and H4RA, H4RB results in the provision of a heated pattern HP1, HP2 (FIG. 1a) on each web W1, W2.

The heated patterns are provided on faces of the web materials W1, W2 which are brought facing one another when the materials W1, W2 are merged into the packaging P. The location of the heated patterns HP1, HP2 is shown in FIG. 1. One of the web materials W1, W2 is coated with a glue layer, particularly a thermally activated adhesive layer which only exhibits substantial bonding properties when heated above a predetermined temperature. Accordingly, the provision of the heated patterns HP1, HP2 also brings with it an activation of the adhesive layer on the web material W1 (or W2, equivalently).

Feeding of the web materials W1, W2 with the heated patterns HP1, HP2 thereon moves on to negotiate a third pair of rollers 6, specifically a pair of bonding rollers R6A, R6B arranged on opposite sides of the merged, layered arrangement of web materials W1, W2. Unlike the rollers in the pairs 2, 4, the bonding rollers R6A, R6B are not heated, but only serve to compress the web materials W1, W2 against one another to achieve bonding between the same at the heated patterns HP1, HP2: compression of the heated layered arrangement of web materials W1, W2 creates the bonding pattern BP at the overlap between the heated patterns HP1, HP2, one of which also features a thermally activated adhesive layer, and seals the web materials W1 and W2 together thereby enclosing the product P as shown in FIG. 1b.

It is to be noted that provision of the heated patterns HP1, HP2 is timed so that they fully overlap when passing through the bonding rollers R6A, R6B, in order to maximize bonding strength and to ensure airtightness of the bonding pattern itself, for instance to preserve features of the product P (for instance, sterility) which would otherwise deteriorate were the bonding pattern not airtight.

However, over time the timing between the pair of rollers may be partially lost due to slip between the web materials W1, W2 and the rollers in the pairs 2 and/or 4 and/or 6, as well as due to materials stretch owing to thermal hysteresis and so on. Accordingly, the features of the bonding pattern BP become exposed to significant deterioration due to the lack of overlap of the heated patterns HP1, HP2 due to loss of timing, which in turn results in loss of bonding strength and loss of a closed bonding perimeter. To date, quality control of the bonding patterns BP is not performed, therefore manufacturers are forced to resort to fixed maintenance schedules to restore the correct timing of the web materials W1, W2 through the roller pairs 2, 4, 6. This may lead, essentially in a non-predictable fashion, either to unnecessary costs due to maintenance schedules tighter than necessary, or to quality deterioration prior to the scheduled maintenance. In other words, not knowing what the actual operating conditions of the machine 1 are when making the bonding pattern BP, it is virtually impossible to decide whether and when to correct timing.

OBJECT OF THE INVENTION

The object of the invention is to solve the aforementioned technical problems. Specifically, it is an object of the invention that of improving consistency in the quality of bonding patterns of product packaging made of bonded web material layers. Another object of the invention is to monitor the actual operating conditions of the bonding process to determine whether and when correction (e.g. restoration of timing) is needed.

SUMMARY OF THE INVENTION

The object of the invention is achieved by a method having the features of the claims that follow, which form an integral part of the technical disclosure provided herein in relation to the invention.

BRIEF DESCRIPTION OF THE FIGURES

Further features and advantages of the invention will become apparent from the following description with reference to the annexed figures, provided purely by way of non-limiting example, wherein:

FIG. 1 is a schematic representation of a manufacturing method and machine according to the prior art, with FIGS. 1a and 1b showing features of the method, FIG. 2 is a schematic representation equivalent to FIG. 1, but relating to a manufacturing method and a machine according to the invention prior art, with FIGS. 2a and 2b showing features of the method, and FIGS. 3a, 3b, 4a and 4b show functional aspects of the method according to the invention.

DETAILED DESCRIPTION

By way of general introduction, items associated to the same reference number(s) as those already used in FIG. 1 designate, except where otherwise specified, the same components/devices/units. The general description of the latter will not therefore be repeated, instead, it is to be understood that the description already rendered in respect of FIG. 1 continues to apply.

With reference to FIGS. 2 to 4, a method for inspection of bonding patterns BP of packages PK for products P (for instance patches or medicated patches) according to the invention is carried out essentially through the provision of a thermal probing device 8 at an output of the machine 1, specifically downstream of a bonding location of the web materials W1 and W2 which corresponds to the pair 6 of bonding rollers R6A, R6B. The thermal probing device 8 is configured for thermally probing the bonding pattern BP and the package PK as the continuous flow of bonded web materials W1, W2 exits the bonding rollers R6A, R6B to detect a thermal response of the bonding pattern BP and the rest of the package PK (FIG. 2b).

In various embodiments, the method according to the invention comprises:
- feeding the first web material W1, particularly along a first feeding direction F1,
- providing the first heated pattern HP1 on the first web material W1, particularly providing the pattern HP1 on one face thereof when negotiating the pair of heated patterned rollers HR2A, HR2B;
- feeding a second web material W2, particularly along a second feeding direction F2 (in the embodiments of the figures F2 is parallel to F1, but this is not mandatory, it depends on the general structure of the machine 1); as disclosed in the foregoing, at least one (preferably one) of the first and second web materials W1, W2 is coated with an adhesive layer, and the respective heated pattern is provided at the adhesive layer;
- providing the second heated pattern HP2 on the second web material, particularly providing the pattern HP2 on one face thereof when negotiating the pair of heated patterned rollers HR4A, HR4B,
- routing the first web material W1 and the second web material W2 to a bonding location, which corresponds to the pair 6 of bonding rollers R6A, R6B, with the first heated pattern HP1 and the second heated pattern HP2 facing one another; routing involves feeding both the web materials W1, W2 so as to merge along a new feeding direction which corresponds to a machine direction MD;
- bonding the first web material W1 to the second web material W2 by compression of the first heated pattern HP1 against the second heated pattern HP2, thereby defining a bonding pattern BP at overlapping areas of the first heated pattern HP1 and the second heated pattern HP2; note also that the product P is fed between the web materials W1, W2 before the same merge at the bonding location, so that upon bonding of the web materials W1, W2 the product P remains enclosed within the bonding pattern BP;
- thermally probing the bonding pattern BP and the package P and detecting a thermal response thereof; the thermal response peaking at the heated patterns HP1, HP2 as compared to the package (P), as the former have a higher temperature than the latter due to localized heating by the roller pairs 2, 4;
- comparing an offset between subsequent peaking locations of the thermal response of the bonding pattern with a reference offset L.

Each of the above method steps will now be disclosed in further details.

Essentially, the manufacturing of packages PK is achieved in a way that is no different from what has been already disclosed in respect of FIG. 1: ultimately, the package PK tha1 is output by the machine 1 should not be subject to any change to allow the inspection method according to the invention. This is one of the technical advantages of the invention: the manufacturing steps and the packaging features remains the same, as the method is non-destructive and non-invasive. The thermal probing device 8 may comprise, for instance an infrared camera or a pyrometer, and may be arranged on one side of the package PK only, as in preferred embodiments, or on both sides, as shown schematically in FIG. 2a, probing devices 8, 8*. This applies regardless of the specific device (infrared camera, pyrometer, etc.).

FIG. 3a is representative of a bonding pattern BP with fully overlapping heated patterns HP1 and HP2. FIG. 3a is therefore representative of operating conditions of the machine 1 fully within design specification, typically found at the beginning of a production cycle, for instance following a scheduled maintenance/timing restoration of the machine 1. Both the heated patterns HP1 and HP2 are lined up and exhibit essentially no staggering along the machine direction MD. When probed by the thermal probing device 8, the package PK, which includes the bonded pattern BP, returns a thermal response that peaks at the bonded pattern BP as the latter has a higher temperature than the remainder of the package on account of the thermal interaction with the rollers HR2A, HR2B and HR4A, HR4B. With two identical heated patterns HP1 and HP2 having a closed perimeter and a pitch L in the machine direction MD, wherein the pitch L is the distance between two opposite sides of the closed perimeter (along the machine direction MD in this case) of fully overlapping heated patterns HP1 HP2, the peaks P1 and P2 have a distribution (a time—t—distribution in the plot of FIG. 3b, which is of course proportional to the spatial distribution through the speed of the flow of packages PK in the machine direction MD) which corresponds to that of the opposite sides of the closed perimeter, i.e. they are spaced by a pitch KL in the machine direction MD which is proportional to the pitch L in the machine direction MD, as said, through the speed of the flow of packages PK in the machine direction MD.

The inter-peak sections of the thermal response plot correspond to the package areas not interested by the heated patterns HP1, HP2, i.e. essentially non-heated areas: this means that in such operating conditions the inter-peak sections of the plot essentially shows no further peaks in the thermal response. The peak-to-peak distance KL of FIG. 3b is the reference offset for the thermal response: under operating conditions according to design specifications, the spatial distribution of the thermal response features individual, well-defined peaks P1, P2, P3 with no peak staggering or duplication.

It should be noted that according to the invention, a peak in the thermal response is meant either as a proper signal peak, for instance the output signal (voltage or current) from a pyrometer that probes the package PK, or as a temperature related data display having features corresponding to high/higher temperature values. For instance, when the thermal probing device is an infrared camera, the output is typically a false color (e.g., grayscale) image of the area framed by the camera, wherein peaks in the thermal response are associated with brighter areas—the same applies to thermal images in general, which are post processed into a false color image wherein warm colours (e.g. red, orange, yellow) are "peaks" within the meaning of the present disclosure, i.e. associated to higher temperature areas. Additionally, based on the usual processing speed of the machine 1, thermal probing is preferably performed based on a sampling time of 1 ms or less.

Turning now to FIG. 4a, the same is representative of a bonding pattern BP' with non-fully overlapping heated patterns HP1 and HP2, in other words staggered heated patterns HP1, HP2. FIG. 4a is therefore representative of operating conditions of the machine 1 that have fallen out of design specifications, and that may potentially result in faulty packages (e.g. non sealed). Such condition is typically found well into the production cycle, for instance when a considerable number of packages PK has been manufactured after a scheduled maintenance/timing restoration of the machine 1.

The heated patterns HP1 and HP2 are no longer lined up and essentially exhibit a staggering L' along the machine direction MD.

When probed by the thermal probing device 8, the package PK, which includes the bonded pattern BP, returns a thermal response that—just as it happens with fully overlapping heated patterns HP1, HP2, peaks at the bonded pattern BP as the latter has a higher temperature than the remainder of the package on account of the thermal interaction with the rollers HR2A, HR2B and HR4A, HR4B.

However (FIG. 4b), as the bonded pattern BP now features staggered heated patterns HP1, HP2, the thermal response peaks at multiplied locations as compared to FIG. 3b. Particularly, a peak will be generated in the thermal response—and moving along the machine direction MD—at HP1-HP2-HP1-HP2, four peaks in total. FIG. 4b is representative of an embodiment of the method of the invention wherein the thermal probing device is arranged on one side only of the package PK, for instance on the top side as visible in FIG. 2, device 8. Thermal probing of the heated pattern of the top layer (web material W1, HP1) will thus generate a much stronger thermal response than the heated pattern of the bottom layer (web material W1, HP2), which will be mitigated by the interposed top layer. Accordingly, the thermal response in FIG. 4b exhibits peaks P1, P1' corresponding to the thermal response at the heated patterns HP1, HP2 occurring first in the machine direction MD, and peaks P2, P2' corresponding to the thermal response at the heated patterns HP1, HP2 occurring second in the machine direction MD (peaks P3, P3' are equivalent to peaks P1, P1', only they refer to an adjacent bonded pattern BP). Peaks P1', P2' have a lower magnitude than peaks P1, P2 on account of the mitigation described above.

As visible in FIG. 4b, peaks P1, P1' are offset by a distance KL', which is proportional to the staggering offset L' through the speed of the flow of packages PK in the machine direction MD, wherein the staggering offset L' of the misplaced heated patterns HP1, HP2, is shorter than the pitch L, hence distance KL' is shorter than distance KL (the coefficient of proportion is the same as it depends from the speed of the packages PK in the direction MD).

The short offset between subsequent peaks, particularly shorter than the reference offset KL, is an evidence of a staggering in the heating pattern as a result of a timing issue in the machine 1.

With two identical heated patterns HP1 and HP2 having a closed perimeter and the pitch L in the machine direction MD, wherein the pitch L is the distance between two opposite sides of the closed perimeter (along the machine direction MD in this case) of fully overlapping heated patterns HP1 HP2, the peaks P1 and P2 have a distribution (a spatial distribution in the plot of FIG. 3b) which corresponds to that of the opposite sides of the closed perimeter, i.e. they are spaced by the same pitch L in the machine direction MD, while peaks P1' and P2' have a distribution that mirrors—except for the magnitude—that of peaks P1, P2, only shifted in space on account of the staggering. The inter-peak sections of the thermal response plot correspond to the package areas not interested by the heated patterns HP1, HP2, i.e. essentially non-heated areas, and are shorter than they are under operating conditions with no timing issues: this means that in operating conditions out of design specifications the inter-peak sections of the plot show evidence of further peaks in the thermal response. The peak-to-peak distance KL' of FIG. 3b is lower than the reference offset KL for the thermal response.

Note that the same consideration apply when the thermal probing device 8 is duplicated on the opposite side of the packages PK. The plot of FIG. 3b would not change—except for a larger magnitude of the thermal response due to both probing devices 8, 8* directly collecting the thermal response of patterns HP1, HP2, with no mitigation by the interposed web material layer W1 or W2. The plot of FIG. 4 would exhibit staggered peaks P1, P1' and P2, P2' with identical or essentially identical magnitudes, again on account of the lack of mitigation of the thermal response by an interposed layer of web material W1 or W2.

It should be noted that the above method applies also in respect of bonding patterns with no closed perimeter, even—at the limit—linear bonding patterns transverse to the machine direction MD: the reference offset in the thermal response in this latter case would be a zero value, and any peak offset in the thermal response of the same bonding pattern will provide evidence of a heated pattern staggering, thus suggesting re-timing of the machine 1. Note also that the same criteria may be applied in respect of the patterns HP1, HP2 shown in the figures: through signal (or image, in case of a probing device comprising an infrared camera) analysis signal peaks may be identified, and whenever the thermal response associated to a single area of overlap of the heated patterns HP1, HP2 exhibits offset peaks (i.e. a non-zero offset), timing issues may be detected accordingly.

Naturally, while the principle of the invention remains the same, the details of construction and the embodiments may widely vary with respect to what has been described and illustrated purely by way of example, without departing from the scope of the present invention.

The invention claimed is:

1. A method for inspection of bonding patterns of packages for products, the method comprising:
   feeding a first web material,
   providing a first heated pattern on the first web material,
   feeding a second web material,
   providing a second heated pattern on the second web material,
   routing the first web material and the second web material to a bonding location with the first heated pattern and the second heated pattern facing one another,
   bonding the first web material to the second web material by compression of the first heated pattern against the second heated pattern, thereby defining a bonding pattern at overlapping areas of the first heated pattern and the second heated pattern,
   thermally probing the bonding pattern and the package and detecting a thermal response thereof, the thermal response peaking at the first and second heated patterns as compared to the package, and
   comparing an offset between subsequent peaking locations of the thermal response of the bonding pattern with a reference offset.

2. The method of claim 1, wherein said reference offset is proportional to a distance between subsequent fully overlapping first and second heated patterns in the bonding pattern.

3. The method of claim 1, wherein the first heated pattern is identical to the second heating pattern.

4. The method of claim 1, wherein said thermally probing comprises thermally probing the bonding pattern and the package on one side thereof only.

5. The method of any of claim 1, wherein said thermally probing comprises thermally probing the bonding pattern and the package on opposite sides thereof only.

6. The method of claim 1, wherein said thermally probing comprises thermally probing by means of an infrared camera.

7. The method of any of claim 1, wherein said thermally probing comprises thermally probing by means of a pyrometer.

8. The method of claim 1, wherein thermally probing the bonding pattern and the package is performed while the package moves out of the bonding location.

9. The method of claim 1, wherein the bonding pattern has a closed perimeter, and wherein the reference offset is a distance between opposite sides of the closed perimeter with fully overlapping first and second heated patterns.

10. The method of claim 1, wherein said providing a first heated pattern on the first web material comprises feeding the first web material through a first pair of heated patterned rollers, and wherein said providing a second heated pattern on the second web material comprises feeding the second web material through a second pair of heated patterned rollers.

11. The method of claim 10, wherein said bonding location comprises a third pair of bonding rollers.

12. The method of claim 1, wherein at least one of the first and second web materials is coated with an adhesive layer, and wherein the heated pattern is provided at the adhesive layer.

13. The method of claim 1, wherein said thermally probing has a sampling time of 1 ms or less.

14. The method of claim 1, further comprising feeding a product at the bonding location prior to bonding the first web material to the second web material.

15. The method of claim 14, comprising bonding the first web material to the second web material so that the product remains enclosed within the bonding pattern.

* * * * *

UNITED STATES PATENT AND TRADEMARK OFFICE
CERTIFICATE OF CORRECTION

| | | |
|---|---|---|
| PATENT NO. | : 11,724,463 B2 | Page 1 of 1 |
| APPLICATION NO. | : 17/901934 | |
| DATED | : August 15, 2023 | |
| INVENTOR(S) | : Anselmo Cicchitti | |

It is certified that error appears in the above-identified patent and that said Letters Patent is hereby corrected as shown below:

On the Title Page

Item (71) Applicant address information should be listed as:
- Fameccanica.Data S.p.A., San Giovanni Teatino (Chieti), ITALY -

Item (72) Inventor address information should be listed as:
- Anselmo Cicchitti, San Giovanni Teatino (Chieti), ITALY -

Item (73) Assignee address information should be listed as:
- Fameccanica.Data S.p.A., San Giovanni Teatino (Chieti), ITALY -

Signed and Sealed this
Twenty-sixth Day of March, 2024

Katherine Kelly Vidal
*Director of the United States Patent and Trademark Office*